(12) United States Patent
Benkreira et al.

(10) Patent No.: US 11,374,914 B2
(45) Date of Patent: Jun. 28, 2022

(54) SYSTEMS AND METHODS FOR DETERMINING KNOWLEDGE-BASED AUTHENTICATION QUESTIONS

(71) Applicant: Capital One Services, LLC, McLean, VA (US)

(72) Inventors: Abdelkader Benkreira, Washington, DC (US); Michael Mossoba, Arlington, VA (US); Joshua Edwards, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 26 days.

(21) Appl. No.: 16/915,342

(22) Filed: Jun. 29, 2020

(65) Prior Publication Data
US 2021/0409389 A1 Dec. 30, 2021

(51) Int. Cl.
*H04L 29/06* (2006.01)
*H04L 9/40* (2022.01)
(Continued)

(52) U.S. Cl.
CPC .............. *H04L 63/08* (2013.01); *G06F 21/31* (2013.01); *H04L 63/102* (2013.01); *H04L 69/22* (2013.01); *H04W 12/06* (2013.01)

(58) Field of Classification Search
CPC ....... H06L 63/08; G06F 21/31; H04L 63/102; H04L 69/22; H04L 63/08; H04W 12/06
See application file for complete search history.

(56) References Cited

U.S. PATENT DOCUMENTS

| 8,397,304 B2 | 3/2013 | Miettinen |
| 8,739,296 B2 | 5/2014 | Walsh et al. |

(Continued)

FOREIGN PATENT DOCUMENTS

| EP | 2131552 A2 | 12/2009 |
| EP | 2677712 A1 | 12/2013 |

(Continued)

OTHER PUBLICATIONS

Notification Concerning Transmittal of International Preliminary Report on Patentability from related PCT Application No. PCT/US2021/037892 dated Sep. 15, 2021.

*Primary Examiner* — Tongoc Tran
(74) *Attorney, Agent, or Firm* — Hunton Andrews Kurth LLP

(57) ABSTRACT

Systems and methods for authenticating a user may include transmitting a request for a first set of information after validation of authentication information; receiving a response comprising the first set of information; parsing the first set of information using one or more template-based algorithms by scanning one or more websites to determine publicly available information associated with a user; comparing compare one or more results of the parsing with a second set of information to yield compromised information associated with the user; eliminating one or more portions of the second set of information based on the comparison; presenting a third set of information to authenticate the user based on the elimination and by supplementing the first set of information with a fourth set of information; and presenting a fifth set of information to authenticate the user if the third set of information fails to reach a predetermined threshold number.

20 Claims, 6 Drawing Sheets

(51) Int. Cl.
*G06F 21/31* (2013.01)
*H04L 69/22* (2022.01)
*H04W 12/06* (2021.01)

(56) References Cited

U.S. PATENT DOCUMENTS

| | | | |
|---|---|---|---|
| 8,925,099 | B1 | 12/2014 | Saxe et al. |
| 9,037,648 | B2 | 5/2015 | Ogilvie et al. |
| 9,514,407 | B1* | 12/2016 | Dotan .................... G06N 5/022 |
| 9,633,322 | B1* | 4/2017 | Burger ................ G06Q 20/405 |
| 9,754,209 | B1 | 9/2017 | Kronrod et al. |
| 10,157,275 | B1* | 12/2018 | Venkatasamy .......... G06F 21/42 |
| 10,165,065 | B1 | 12/2018 | Anantharaju et al. |
| 10,482,223 | B1* | 11/2019 | Sokolov .................. G06F 21/31 |
| 10,812,478 | B1* | 10/2020 | Davis ...................... G06F 21/40 |
| 2007/0208613 | A1 | 9/2007 | Backer |
| 2010/0293608 | A1 | 11/2010 | Schechter et al. |
| 2012/0079576 | A1 | 3/2012 | Han et al. |
| 2013/0054433 | A1 | 2/2013 | Giard et al. |
| 2013/0133034 | A1 | 5/2013 | Strietzel et al. |
| 2013/0226949 | A1 | 8/2013 | Ogilvie et al. |
| 2017/0053280 | A1* | 2/2017 | Lishok ............... G06Q 20/3224 |
| 2017/0177881 | A1 | 6/2017 | Krishna et al. |
| 2017/0286768 | A1* | 10/2017 | Livesay ............. G06K 9/00892 |
| 2018/0025140 | A1 | 1/2018 | Edelman et al. |
| 2018/0205727 | A1* | 7/2018 | Hwang ................... G06F 21/31 |
| 2018/0219670 | A1 | 8/2018 | Bonti et al. |
| 2019/0259030 | A1 | 8/2019 | Burger |
| 2020/0382327 | A1* | 12/2020 | Mokhasi ............... G06Q 20/202 |

FOREIGN PATENT DOCUMENTS

| | | |
|---|---|---|
| EP | 3254258 A1 | 12/2017 |
| WO | 2010150108 A1 | 12/2010 |
| WO | 2014070878 A1 | 5/2014 |
| WO | 2015200808 A1 | 12/2015 |
| WO | 2016109496 A1 | 7/2016 |
| WO | 2016126971 A1 | 8/2016 |
| WO | 2018034836 A1 | 2/2018 |

* cited by examiner

SYSTEMS AND METHODS FOR DETERMINING KNOWLEDGE-BASED AUTHENTICATION QUESTIONS

FIELD OF THE DISCLOSURE

The present disclosure relates to systems and methods for determining knowledge-based authentication questions.

BACKGROUND

There are numerous ways in which information about a user may be compromised or misused by a malicious actor. For example, an account may be hacked and answers to password questions may be revealed. In another example, the user may have themselves revealed this information. Thus, the data may be compromised by the user or an actor other than the user. For these or other reasons, it becomes difficult to authenticate the user. Such situations present increased security risks, and conventionally known static challenge response mechanisms can lead to unreliable verification.

These and other deficiencies exist. Thus, there is a need to overcome these problems by authenticating a user, and not authenticating a fraudulent user, in a secure, reliable, and dynamic manner without comprising data or user integrity.

SUMMARY OF THE DISCLOSURE

Embodiments of the present disclosure provide an authentication system, including one or more servers each including one or more processors. The one or more processors may be configured to validate authentication information received from an application comprising instructions for execution on a device. The one or more processors may be configured to transmit, to the application, a request for a first set of information after validation of the authentication information. The one or more processors may be configured to receive, from the application, a response comprising the first set of information. The one or more processors may be configured to parse the first set of information using one or more template-based algorithms by scanning one or more websites to determine publicly available information associated with a user. The one or more processors may be configured to compare one or more results of the parsing with a second set of information, the comparison of the one or more results with the second set of information yielding compromised information associated with the user. The one or more processors may be configured to eliminate one or more portions of the second set of information based on the comparison. The one or more processors may be configured to present a third set of information to the application to authenticate the user based on the elimination of the one or more portions of the second set of information and by supplementing the first set of information with a fourth set of information. The one or more processors may be configured to present a fifth set of information to authenticate the user if the third set of information fails to reach a predetermined threshold number.

Embodiments of the present disclosure provide a method of authenticating a user. The method may include validating authentication information. The method may include requesting a social media handle after validating the authentication information. The method may include parsing a social media account associated with the social media handle using one or more template-based algorithms by scanning one or more websites to determine publicly available information associated with a user. The method may include comparing results of the parsing with a plurality of a first set of knowledge-based authentication questions, the comparison of the one or more results with the plurality of the first set of knowledge-based authentication questions yielding compromised information associated with the user. The method may include eliminating one or more questions of the knowledge-based authentication questions based on the comparison. The method may include presenting a second set of knowledge-based authentication questions, the second set of knowledge-based questions including a modified version of the first set of knowledge-based authentication questions based on the eliminated one or more questions. The method may include determining if the second set of knowledge-based authentication questions reaches a predetermined threshold number, and presenting additional knowledge-based authentication questions if the second set of knowledge-based authentication questions fails to reach the predetermined threshold number. The method may include receiving one or more responses to the second set of knowledge-based authentication questions to authenticate the user.

Embodiments of the present disclosure provide a computer readable non-transitory medium comprising computer-executable instructions that are executed on a processor and comprising the steps of validating authentication information, obtaining a first set of information after validating the authentication information, parsing the first set of information using one or more template-based algorithms by scanning one or more websites to determine publicly available information associated with a user, comparing one or more results of the parsing with a second set of information, the comparison of the one or more results with the second set of information yielding compromised information associated with the user, eliminating one or more portions of the second set of information based on the comparison, presenting a third set of information to the application based on the elimination of the one or more portions of the second set of information and by supplementing the first set of information with a fourth set of information, presenting a fifth set of information to authenticate the user if the third set of information fails to reach a predetermined threshold number, and receiving one or more responses to the third set of information so as to authenticate a user.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
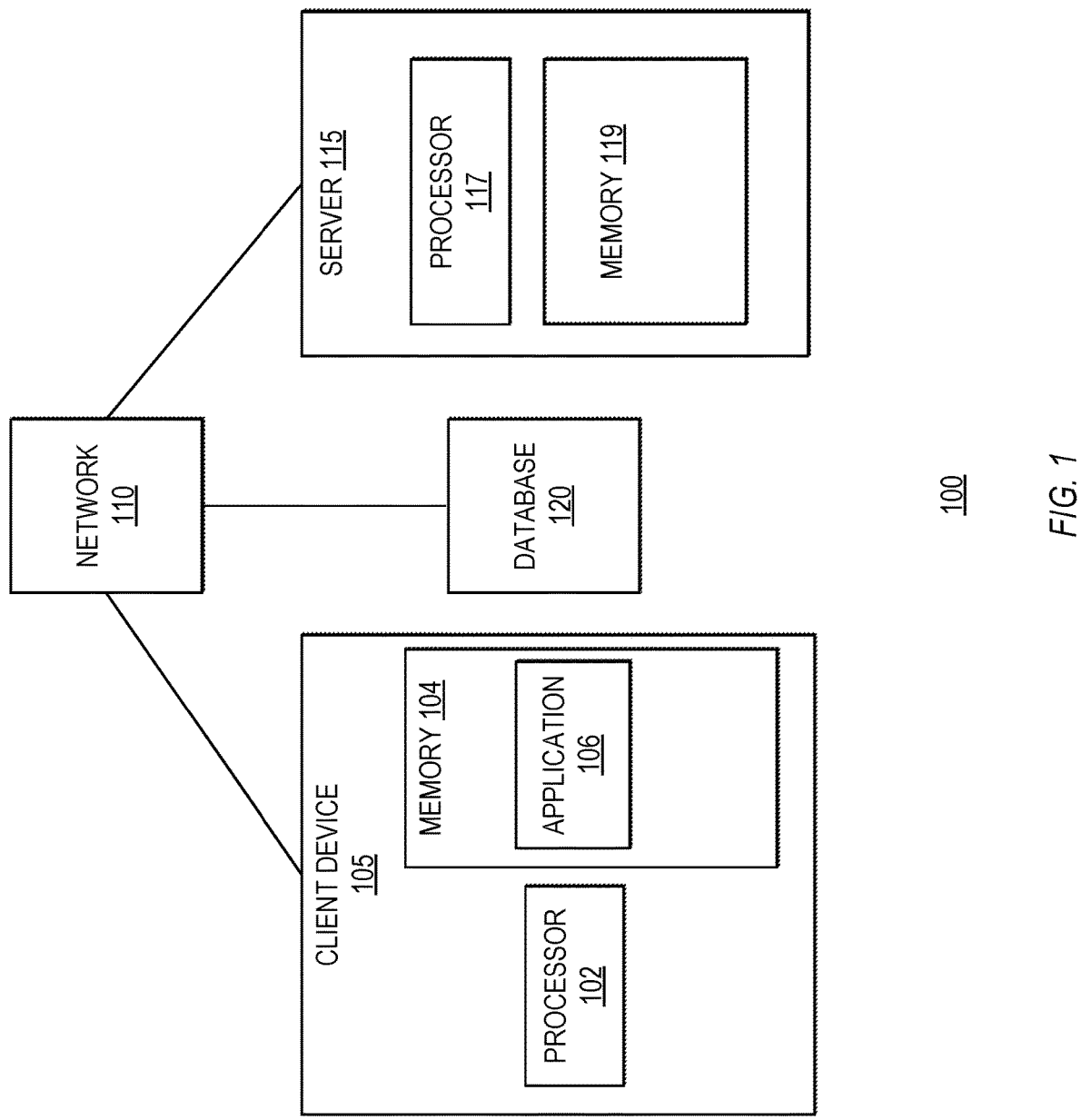
FIG. 1 depicts an authentication system according to an exemplary embodiment.

FIG. 1 illustrates an authentication system 100. The authentication system 100 may comprise a client device 105, a network 110, a server 115, and a database 120. Although FIG. 1 illustrates single instances of components of system 100, system 100 may include any number of components.

System 100 may include a client device 105. The client device 105 may include one or more processors 102, and memory 104. Memory 104 may include one or more applications 106. Client device 105 may be in data communication with any number of components of system 100. For example, client device 105 may transmit data via network 110 to server 115. Client device 105 may transmit data via network 110 to database 120. Without limitation, client device 105 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Client device 105 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 105 may include processing circuitry and may contain additional components, including processors, memories, error and parity/CRC checkers, data encoders, anticollision algorithms, controllers, command decoders, security primitives and tamperproofing hardware, as necessary to perform the functions described herein. The client device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 110. In some examples, network 110 may be one or more of a wireless network, a wired network or any combination of wireless network and wired network, and may be configured to connect to any one of components of system 100. For example, client device 105 may be configured to connect to server 115 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include one or more servers 115. In some examples, server 115 may include one or more processors 117 coupled to memory 119. Server 115 may be configured as a central system, server or platform to control and call various data at different times to execute a plurality of workflow actions. Server 115 may be configured to connect to client device 105. Server 115 may be in data communication with the application 106. For example, a server 115 may be in data communication with application 106 via one or more networks 110. Client device 105 may be in communication with one or more servers 115 via one or more networks 110, and may operate as a respective front-end to back-end pair with server 115. Client device 105 may transmit, for example from application 106 executing thereon, one or more requests to server 115. The one or more requests may be associated with retrieving data from server 115. Server 115 may receive the one or more requests from client device 105. Based on the one or more requests from application 106, server 115 may be configured to retrieve the requested data. Server 115 may be configured to transmit the received data to application 106, the received data being responsive to one or more requests.

Server 115 may include an application comprising instructions for execution thereon. For example, the application may comprise instructions for execution on the server 115. The application may be in communication with any components of system 100. For example, server 115 may execute one or more applications that enable, for example, network and/or data communications with one or more components of system 100 and transmit and/or receive data. Without limitation, server 115 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 115 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 115 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 115 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include one or more databases 120. The database 120 may comprise a relational database, a non-relational database, or other database implementations, and any combination thereof, including a plurality of relational databases and non-relational databases. In some examples, the database 120 may comprise a desktop database, a mobile database, or an in-memory database. Further, the database 120 may be hosted internally by the client device 105 or server 115, or the database 120 may be hosted externally to the client device 105 and server 115, by a cloud-based platform, or in any storage device that is in data communication with the client device 105 and server 115. In some examples, database 120 may be in data communication with any number of components of system 100. For example, server 115 may be configured to retrieve the requested data from the database 120 that is transmitted by application 106. Server 115 may be configured to transmit the received data from database 120 to application 106 via network 110, the received data being responsive to the transmitted one or more requests. In other examples, application 106 may be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client device 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The one or more processors 117 may be configured to validate authentication information received from the application 106. For example, the application 106 may be configured to transmit authentication information to the one or more processors 117 for validation. Without limitation, the authentication information may include at least one selected from the group of login credentials, account information, security information, biometric information and/or any combination thereof (e.g., entry of a user name, a password, an account number, a security code, a one-time passcode, an answer to a security question, a fingerprint, a facial scan, a retinal scan, a voice recognition.) For example, the application 106 may be configured to transmit a password and security code to the one or more processors 117. The one or more processors 117 may be configured to receive the password the security code and compare with reference authentication information so as to deny or permit access privilege to the application 106. In this manner, the one or more processors 117 may be configured to validate the authentication information received from the application 106.

The one or more processors 117 may be configured to transmit, to the application 106, a request for a first set of information after validation of the authentication information. In some examples, the first set of information may comprise social media information associated with a user. For example, the social media information may include at least one selected from the group of a social media handle, a social media username or login, a social media password. Without limitation, the social media handle may include any handle or identifier associated with a social media network, such as Facebook®, Twitter®, Instagram®, LinkedIn®, or the like. For example, this may include an "@" symbol that precedes the user name. Thus, the one or more processors 117, application 106, and/or database 120 may connect to any of these social media networks to obtain the first set of information. Without limitation, the social media username or login may include any name or identifier associated with a social media account or profile. Without limitation, the social media password may be associated with the social media account, social media handle, and/or social media username or login. Without limitation, the social media profile may yield posts that have been made by the user or somebody else other than the user, and posts that the user engages with (including but not limited to likes, retweets, comments). In some examples, it may be desirable for a user to selectively opt-in, via the application 106, to provide social media information to the application 106, such that the user may selectively decide which contents of social media accounts may be shared and/or prohibited from being shared.

In some examples, the one or more processors 117 may be configured to retrieve the first set of information from the application 106. For example, the application 106 may be configured to display one or more prompts, responsive to the request from the one or more processors 117 that require input of the first set of information. In some examples, the application 106 may transmit and receive input responsive to the request. For example, the application 106 may be configured to display a prompt for a social media handle.

The application 106 may be configured to receive input, including but not limited to voice input, text input, image input, and/or any combination thereof, which includes the first set of information. In other examples, the one or more processors 117 may be configured to retrieve the first set of information from a database, such as database 120, via one or more requests. For example, the one or more processors 117 may be configured to match a user based on registration information. Without limitation, registration information may include at least one selected from the group of name, mailing address, email, birthdate, user name, password, account number, credit card number, debit card number, and/or any combination thereof.

The one or more processors 117 may be configured to receive, from the application 106, a response comprising the first set of information. For example, the application 106 may be configured to transmit a response that is responsive to the request from the one or more processors 117. The application 106 may be configured to present a display for input of the first set of information based on the request. In some examples, the application 106 may transmit and receive input responsive to the request. For example, the application 106 may be configured to display a prompt for a social media handle. The application 106 may be configured to receive input, including but not limited to voice input, text input, image input, and/or any combination thereof, that includes the first set of information, such as the social media handle. In this manner, the application 106 may be configured to transmit one or more responses includes the first set of information.

The one or more processors 117 may be configured to parse the first set of information using one or more template-based algorithms by scanning one or more websites to determine publicly available information associated with a user. For example, the one or more processors 117 may be configured to verify the one or more results of the parsing based on the one or more template-based algorithms for each type of website associated with the first set of information. In some examples, one template-based algorithm for a web site may be different from a template-based algorithm for another website. Depending on the type of website, there may be known data elements on a page, in which a search is made within that data element for compromised information. In some examples, a page may comprise a document object model (DOM) element with a specific class or identifier, which may indicate that the element belongs to a publicly visible post associated with the user. Other data elements with other identifiers may indicate a post that was sent to the user. These data elements may comprise text, which includes the contents of the message itself. In another example, a DOM element may indicate other individuals or entities that the user is associated with. These may include, without limitation, friends and/or entities that the user follows or has subscribed to. It is understood that other data elements with respective identifiers may indicate, in addition to posts, a tweet, a retweet, tag, photo caption, photo tag, comment, mutual friend, friend, suggested contact, post, blog entry, or the like, and/or any combination thereof, may also be associated with the user.

In some examples, the one or more processors 117 may be configured to parse the first set of information utilizing at least one selected from the group of an application programming interface and a web crawler. For example, the one or more processors 117 may be configured to parse the first set of information utilizing an application programming interface. In this manner, one or more application programming interfaces may be called on, via one or more function calls by the one or more processors 117, to receive data. For example, a response of the application programming interface call may comprise a list including different messages that the user has posted, whether these messages were publicly available, and when they were posted. In another example, a response of the application programming interface call may comprise a list of all messages, including the different messages and the user that posted them. In this manner, the response may be selectively filtered to include messages relevant to the user in question.

In another example, the one or more processors 117 may be configured to parse the first set of information utilizing a web crawler. For example, the web crawler may be configured to search, via the Internet, for any information associated with the user. In some examples, the information associated with the user may be any information that is publicly available via the Internet. The web crawler may look for one or more words and/or phrases, such as on a website, and then conduct a search within the entire text body associated with the website. For example, the web crawler may be configured to navigate to a search engine, input information, and initiate a search. Without limitation, the input information may include any user public information, such as their first name or first initial, their middle initial or middle name, their last name, and/or any combination thereof, and any and all of which may be partially redacted. The web crawler may be configured to parse a response associated with the initiated search and identify one or more links therein. The one or more processors 117 may be configured to load each of the one or more links, and then search within the body of each of the respective web sites loaded from each of the one or more links for any information related to the one or more knowledge-based authentication questions.

It is understood that the first set of information is not limited to social media information or social media accounts. The first set of information may include registration information. Moreover, other websites or accounts may be included as an addition or alternative to the social media information or social media accounts. For example, one or more websites may be scanned to determine publicly available information associated with a user. In one example, publicly available information associated with a user may be obtained from a school website associated with the user. In another example, publicly available information associated with a user may be obtained from an employer website associated with the user. In yet another example, publicly available information associated with a user may be obtained from a non-profit web site or volunteer organization website associated with the user. In yet another example, publicly available information associated with a user may be obtained from a government agency website listing a license associated with the user.

The one or more processors 117 may be configured to compare one or more results of the parsing with a second set of information. In some examples, the one or more processors 117 may be configured to compare the results of the parsing from the application programming interface call process with the second set of information. In another example, the one or more processors 117 may be configured to compare the results of the parsing from the web crawler process with the second set of information. The comparison of the one or more results from any of the parsing processes with the second set of information may yield compromised information associated with the user.

For example, the second set of information may comprise knowledge-based authentication information. In some examples, the one or more processors 117 may be configured to generate the second set of information. In some examples, the knowledge-based authentication information may include one or more knowledge-based authentication questions. As referred to herein, a knowledge-based authentication question may be any question that is generated from any type of information requested or otherwise obtained in order to authenticate a user. Without limitation, a knowledge-based authentication question may include any question requesting or otherwise concerning the birth month or birth year, the mother's maiden name, favorite color, name of first pet, user nickname, first time of car purchase or car ownership, name of first city lived in, school mascot, favorite sports team, favorite food or drink item, favorite book, favorite teacher, supervisor or boss name, favorite musician, street name or any other address information, favorite movie or television show, email address, account number, mobile device number, or the like. It is understood that these questions are exemplary knowledge-based authentication questions, and that first may alternatively be substituted by second, third, fourth, etc., favorite may be alternatively be substituted by disfavorite, etc. It is further understood that these questions may request any portion (e.g. last two digits of a year instead of the full four digits of a year; last four characters of an email address instead of the full email address); and that the names are not limited to such (e.g. mother's maiden name may be substituted by another person and/or a middle name; favorite car or book may be substituted by any item).

In one example, the one or more processors 117 may be configured to yield compromised information about a user, such as the name of their mascot, that was identified as a result of the parsing process. For example, the one or more processors 117 may be configured to determine, via the first set of information, that a user attended a particular school or university or academic institution. Without limitation, this first set of information may be posted as a tweet, a retweet, tag, photo caption, photo tag, comment, mutual friend, friend, suggested contact, post, blog entry, or the like, such as the user attended the school during a particular time. Based on this first set of information, the one or more processors may be configured to identify the name of their school mascot as a result of the parsing process, thereby resulting in compromised information.

In another example, the one or more processors 117 may be configured to yield compromised information about a user, such as their mother's maiden name, that was identified as a result of the parsing process. For example, the one or more processors 117 may be configured to determine, via the first set of information, a user's mother's maiden name that was posted as a tweet, a retweet, tag, photo caption, photo tag, comment, mutual friend, friend, suggested contact, post, blog entry, or the like. Based on this first set of information, the one or more processors 117 may be configured to identify the mother's maiden name as a result of the parsing process, thereby resulting in compromised information.

The compromised information may include one or more matches by the one or more processors 117 that are associated with, without limitation, at least one selected from the group of a name, birthday, mascot, school, pet, location, automobile, entertainment preferences (e.g., favorite television shows, movies, music, games, sports teams, actors/actresses, musicians, athletes), family, and/or any combination thereof that may be associated with the user and any number of knowledge-based authentication questions. The one or more processors 117 may be configured to eliminate one or more portions of the second set of information based on the comparison. This elimination process may result in determining the validity or invalidity of knowledge-based authentication questions that are presented, as discussed below.

It is understood that simply providing information to a social media account does not necessarily amount to providing compromised information. For example, even though a birthdate may be provided to Facebook®, this may not equate to providing compromised information that may be matched with a corresponding knowledge-based authentication question because if Facebook® does not show the birthdate, then this information would not be deemed publicly available. In some examples, publicly available information may comprise any information made available by the user to a social media account or website, and also an understanding or agreement that there was permission to post such information.

In the above illustrative examples, the one or more processors 117 may be configured to eliminate one or more knowledge-based authentication questions from the second set of information based on the one or more matches with the school mascot, mother's maiden name, and/or any combination thereof. In this manner, the second set of information associated with each of these types of compromised information would be eliminated from the set of knowledge-based authentication questions based on the respective matches by the one or more processors 117. Thus, the knowledge-based authentication questions associated with the compromised information are prevented from being presented since, to some degree, the compromised information was publicly available, and additional knowledge-based authentication questions may be presented in lieu of the eliminated knowledge-based authentication questions. In this manner, the compromised knowledge-based authentication questions are identified, invalidated, and refrained from presenting for authentication of the user. By way of example, even if only a single knowledge-based authentication question from a set of four knowledge-based authentication questions is eliminated based on a match to yield compromised information, this represents a 25% improvement since that particular compromised knowledge-based authentication question, no matter how obvious or minute, is invalidated and is significant since it is not used as part of the user authentication.

The one or more processors 117 may be configured to present a third set of information to the application 106 to authenticate the user based on the elimination of the one or more portions of the second set of information and by supplementing the first set of information with a fourth set of information. In some examples, the third set of information may comprise a subset of the second set of information. For example, the second set of information may include a first number of knowledge-based authentication questions, such as 2 or more. The third set of information may comprise a second number of knowledge-based authentication questions. The second number may be smaller than the first number. For example, the second of information may include 5 knowledge-based authentication questions, and the third set of information may include 3 knowledge-based authentication questions.

In some examples, the fourth set of information may comprise registration information associated with the user. Without limitation, registration information may include at least one selected from the group of name, mailing address, email, birthdate, user name, password, account number, credit card number, debit card number, and/or any combination thereof. For example, the one or more processors 117 may be configured to authenticate the user by supplementing the social media information with registration information. In some examples, the registration information may be used to register an account with the user if a matching account has not been previously created. In other examples, the registration information may also be used to opt-in the user to access the application 106. In other examples, the registration information may also be used to register an account with the user if the user forgot their login and/or password.

The one or more processors 117 may be configured to receive one or more additional responses from the application 106 so as to authenticate the user, the one or more responses being responsive to the third set of information. For example, the application 106 may be configured to transmit one or more additional responses to the one or more processors 117 to authenticate the user. In this manner, the second number of knowledge-based authentication questions may be used to authenticate the user and responsive to the one or more additional requests from the one or more processors 117.

The one or more processors 117 may be configured to present a fifth set of information to authenticate the user if the third set of information fails to reach a predetermined threshold number. The fifth set of information may comprise additional information that is supplemented to the second set of information. The additional information may include one or more additional knowledge-based authentication questions that are included in the second set of information, such as the original set of knowledge-based authentication questions. For example, the fifth set of information may be presented to authenticate the user if the third set of information fails to reach any threshold value, such as 4. With respect to the threshold value, if the one or more processors 117 determine that there are not enough knowledge-based authentication questions that are asked, and/or that there are not enough responses received or otherwise responsive to the knowledge based authentication questions, the one or more processors 117 may be configured to present additional knowledge-based authentication questions that are different from those presented in the third set of information. Thus, the knowledge-based authentication questions, or responses thereto, of the third set of information may fail to reach 4, in which case one or more additional knowledge-based authentication questions of a fifth set of information are presented so as to authenticate the user as part of a multi-factor authentication process.

Figure 2:
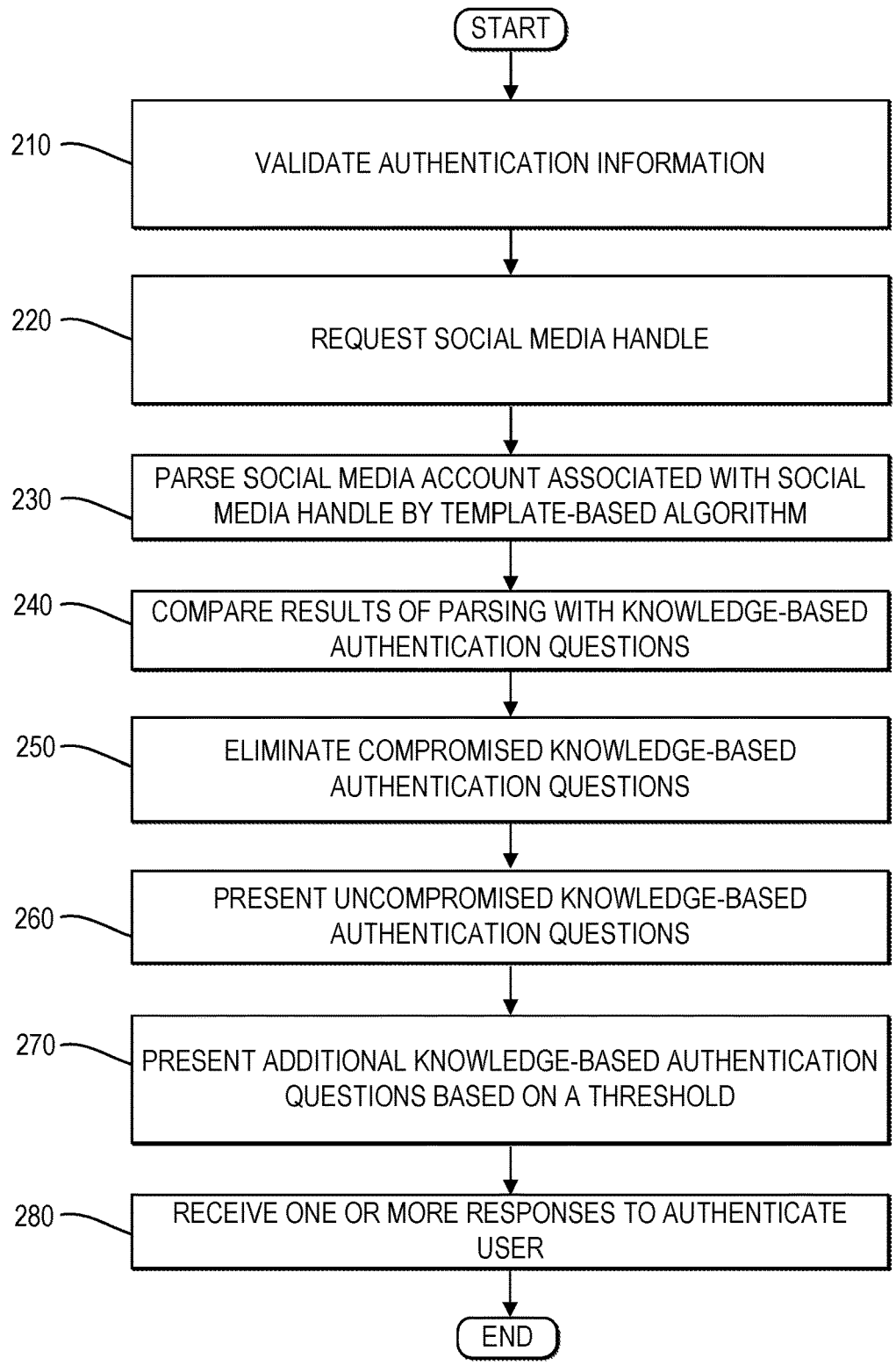
FIG. 2 depicts a method of user authentication according to an exemplary embodiment.

FIG. 2 illustrates a method of user authentication. Method 200 reference the same or similar components of the authentication system 100, as explained above with respect to FIG. 1.

At block 210, the method 200 may comprise validating authentication information. For example, one or more processors of a server may be configured to validate authentication information received from an application. The application may comprise instructions for execution on a client device. For example, the application may be configured to transmit authentication information to the one or more processors for validation. Without limitation, the authentication information may include at least one selected from the group of login credentials, account information, security information, biometric information and/or any combination thereof (e.g., entry of a user name, a password, an account number, a security code, a one-time passcode, an answer to a security question, a fingerprint, a facial scan, a retinal scan, a voice recognition.) For example, the application may be configured to transmit a password and security code to the one or more processors. The one or more processors may be configured to receive the password the security code and compare with reference authentication information so as to deny or permit access privilege to the application. In this manner, the one or more processors may be configured to validate the authentication information received from the application.

The one or more processors may be configured to transmit, to the application, a request for a first set of information after validation of the authentication information. In some examples, the first set of information may comprise social media information associated with a user. For example, the social media information may include at least one selected from the group of a social media handle, a social media username or login, a social media password. Without limitation, the social media handle may include any handle or identifier associated with a social media network, such as Facebook®, Twitter®, Instagram®, LinkedIn®, or the like. For example, this may include an "@" symbol that precedes the user name. Thus, the one or more processors, application, and/or database may connect to any of these social media networks to obtain the first set of information. Without limitation, the social media username or login may include any name or identifier associated with a social media account or profile. Without limitation, the social media password may be associated with the social media account, social media handle, and/or social media username or login. Without limitation, the social media profile may yield posts that have been made by the user or somebody else other than the user, and posts that the user engages with (including but not limited to likes, retweets, comments). In some examples, it may be desirable for a user to selectively opt-in, via the application, to provide social media information to the application, such that the user may selectively decide which contents of social media accounts may be shared and/or prohibited from being shared.

At block 220, the method 200 may comprise requesting a social media handle. For example, the one or more processors may be configured to retrieve the first set of information from the application. In some examples, the application may be configured to display one or more prompts, responsive to the request from the one or more processors, that require input of the first set of information. In some examples, the application may transmit and receive input responsive to the request. For example, the application may be configured to display a prompt for a social media handle. The application may be configured to receive input, including but not limited to voice input, text input, image input, and/or any combination thereof, that includes the first set of information. In other examples, the one or more processors may be configured to retrieve the first set of information from a database via one or more requests. For example, the one or more processors may be configured to match a user based on registration information. Without limitation, registration information may include at least one selected from the group of name, mailing address, email, birthdate, user name, password, account number, credit card number, debit card number, and/or any combination thereof.

The one or more processors may be configured to receive, from the application, a response comprising the first set of information. For example, the application may be configured to transmit a response that is responsive to the request from the one or more processors. The application may be configured to present a display for input of the first set of information based on the request. In some examples, the application may transmit and receive input responsive to the request. For example, the application may be configured to display a prompt for a social media handle. The application may be configured to receive input, including but not limited to voice input, text input, image input, and/or any combination thereof, that includes the first set of information, such as the social media handle. In this manner, the application may be configured to transmit one or more responses includes the first set of information.

At block 230, the method 200 may comprise parsing social media account information associated with the social media handle. For example, the one or more processors may be configured to parse the first set of information using one or more template-based algorithms by scanning one or more websites to determine publicly available information associated with a user. For example, the one or more processors may be configured to verify the one or more results of the parsing based on the one or more template-based algorithms for each type of website associated with the first set of information. In some examples, one template-based algorithm for a website may be different from a template-based algorithm for another website. Depending on the type of website, there may be known data elements on a page, in which a search is made within that data element for compromised information. In some examples, a page may comprise a DOM element with a specific class or identifier, which may indicate that the element belongs to a publicly visible post associated with the user. Other data elements with other identifiers may indicate a post that was sent to the user. These data elements may comprise text, which includes the contents of the message itself. In another example, a DOM element may indicate other individuals or entities that the user is associated with. These may include, without limitation, friends and/or entities that the user follows or has subscribed to. It is understood that other data elements with respective identifiers may indicate, in addition to posts, a tweet, a retweet, tag, photo caption, photo tag, comment, mutual friend, friend, suggested contact, post, blog entry, or the like, and/or any combination thereof, may also be associated with the user.

In some examples, the one or more processors may be configured to parse the first set of information utilizing at least one selected from the group of an application programming interface and a web crawler. For example, the one or more processors may be configured to parse the first set of information utilizing an application programming interface. In this manner, one or more application programming interfaces may be called on, via one or more function calls by the one or more processors, to receive data. For example, a response of the application programming interface call may comprise a list including different messages that the user has posted, whether these messages were publicly available, and when they were posted. In another example, a response of the application programming interface call may comprise a list of all messages, including the different messages and the user that posted them. In this manner, the response may be selectively filtered to include messages relevant to the user in question.

In another example, the one or more processors may be configured to parse the first set of information utilizing a web crawler. For example, the web crawler may be configured to search, via the Internet, for any information associated with the user. In some examples, the information associated with the user may be any information that is publicly available via the Internet. The web crawler may look for one or more words and/or phrases, such as on a website, and then conduct a search within the entire text body associated with the website. For example, the web crawler may be configured to navigate to a search engine, input information, and initiate a search. Without limitation, the input information may include any user public information, such as their first name or first initial, their middle initial or middle name, their last name, and/or any combination thereof, and any and all of which may be partially redacted. The web crawler may be configured to parse a response associated with the initiated search and identify one or more links therein. The one or more processors may be configured to load each of the one or more links, and then search within the body of each of the respective websites loaded from each of the one or more links for any information related to the one or more knowledge-based authentication questions.

It is understood that the first set of information is not limited to social media information or social media accounts. The first set of information may include registration information. Moreover, other websites or accounts may be included as an addition or alternative to the social media information or social media accounts. For example, one or more websites may be scanned to determine publicly available information associated with a user. In one example, publicly available information associated with a user may be obtained from a school website associated with the user. In another example, publicly available information associated with a user may be obtained from an employer website associated with the user. In yet another example, publicly available information associated with a user may be obtained from a non-profit web site or volunteer organization website associated with the user. In yet another example, publicly available information associated with a user may be obtained from a government agency website listing a license associated with the user.

At block 240, the method 200 may comprise comparing results of the parsing with knowledge-based authentication questions. For example, the one or more processors may be configured to compare one or more results of the parsing with a second set of information. In some examples, the one or more processors may be configured to compare the results of the parsing from the application programming interface call process with the second set of information. In another example, the one or more processors may be configured to compare the results of the parsing from the web crawler process with the second set of information. The comparison of the one or more results from any of the parsing processes with the second set of information may yield compromised information associated with the user.

For example, the second set of information may comprise knowledge-based authentication information. In some examples, the one or more processors may be configured to generate the second set of information. In some examples, the knowledge-based authentication information may include one or more knowledge-based authentication questions. As referred to herein, a knowledge-based authentication question may be any question that is generated from any type of information requested or otherwise obtained in order to authenticate a user.

In one example, the one or more processors may be configured to yield compromised information about a user, such as the name of their mascot, that was identified as a result of the parsing process. For example, the one or more processors may be configured to determine, via the first set of information, that a user attended a particular school or university or academic institution. Without limitation, this first set of information may be posted as a tweet, a retweet, tag, photo caption, photo tag, comment, mutual friend, friend, suggested contact, post, blog entry, or the like, such as the user attended the school during a particular time. Based on this first set of information, the one or more processors may be configured to identify the name of their school mascot as a result of the parsing process, thereby resulting in compromised information.

In another example, the one or more processors may be configured to yield compromised information about a user, such as their mother's maiden name, that was identified as a result of the parsing process. For example, the one or more processors may be configured to determine, via the first set of information, a user's mother's maiden name that was posted as a tweet, a retweet, tag, photo caption, photo tag, comment, mutual friend, friend, suggested contact, post, blog entry, or the like. Based on this first set of information, the one or more processors may be configured to identify the mother's maiden name as a result of the parsing process, thereby resulting in compromised information.

The compromised information may include one or more matches by the one or more processors that are associated with, without limitation, at least one selected from the group of a name, birthday, mascot, school, pet, location, automobile, entertainment preferences, family, and/or any combination thereof that may be associated with the user and any number of knowledge-based authentication questions. The one or more processors may be configured to eliminate one or more portions of the second set of information based on the comparison. This elimination process may result in determining the validity or invalidity of knowledge-based authentication questions that are presented, as discussed below.

It is understood that simply providing information to a social media account does not necessarily amount to providing compromised information. For example, even though a birthdate may be provided to Facebook®, this may not equate to providing compromised information that may be matched with a corresponding knowledge-based authentication question because if Facebook does not show the birthdate, then this information would not be deemed publicly available. In some examples, publicly available information may comprise any information made available by the user to a social media account or website, and also an understanding or agreement that there was permission to post such information.

At block 250, the method 200 may comprise eliminating compromised knowledge-based authentication questions. For example, the one or more processors may be configured to eliminate one or more knowledge-based authentication questions from the second set of information based on the one or more matches with the school mascot, mother's maiden name, and/or any combination thereof. In this manner, the second set of information associated with each of these types of compromised information would be eliminated from the set of knowledge-based authentication questions based on the respective matches by the one or more processors. Thus, the knowledge-based authentication questions associated with the compromised information are prevented from being presented since, to some degree, the compromised information was publicly available, and additional knowledge-based authentication questions may be presented in lieu of the eliminated knowledge-based authentication questions. In this manner, the compromised knowledge-based authentication questions are identified, invalidated, and refrained from presenting for authentication of the user. By way of example, even if only a single knowledge-based authentication question from a set of four knowledge-based authentication questions is eliminated based on a match to yield compromised information, this represents a 25% improvement since that particular compromised knowledge-based authentication question, no matter how obvious or minute, is invalidated and is significant since it is not used as part of the user authentication.

At block 260, the method 200 may comprise presenting uncompromised knowledge-based authentication questions. For example, the one or more processors may be configured to present a third set of information to the application to authenticate the user based on the elimination of the one or more portions of the second set of information and by supplementing the first set of information with a fourth set of information. In some examples, the third set of information may comprise a subset of the second set of information. For example, the second set of information may include a first number of knowledge-based authentication questions, such as 2 or more. The third set of information may comprise a second number of knowledge-based authentication questions. The second number may be smaller than the first number. For example, the second of information may include 5 knowledge-based authentication questions, and the third set of information may include 3 knowledge-based authentication questions.

In some examples, the fourth set of information may comprise registration information associated with the user. Without limitation, registration information may include at least one selected from the group of name, mailing address, email, birthdate, user name, password, account number, credit card number, debit card number, and/or any combination thereof. For example, the one or more processors may be configured to authenticate the user by supplementing the social media information with registration information. In some examples, the registration information may be used to register an account with the user if a matching account has not been previously created. In other examples, the registration information may also be used to opt-in the user to use the application. In other examples, the registration information may also be used to register an account with the user if the user forgot their login and/or password.

At block 270, the method 200 may comprise presenting additional knowledge-based authentication questions based on a threshold. For example, the one or more processors may be configured to present a fifth set of information to authenticate the user if the third set of information fails to reach a predetermined threshold number. The fifth set of information may comprise additional information that is supplemented to the second set of information. The additional information may include one or more additional knowledge-based authentication questions that are included in the second set of information, such as the original set of knowledge-based authentication questions. For example, the fifth set of information may be presented to authenticate the user if the third set of information fails to reach any threshold value, such as 4. With respect to the threshold value, if the one or more processors determine that there are not enough knowledge-based authentication questions that are asked, and/or that there are not enough responses received or otherwise responsive to the knowledge based authentication questions, the one or more processors may be configured to present additional knowledge-based authentication questions that are different from those presented in the third set of information. Thus, the knowledge-based authentication questions, or responses thereto, of the third set of information may fail to reach 4, in which case one or more additional knowledge-based authentication questions of a fifth set of information are presented so as to authenticate the user as part of a multifactor authentication process.

At block 280, the method 200 may comprise receiving one or more responses to authenticate the user. For example, the one or more processors may be configured to receive one or more additional responses from the application so as to authenticate the user, the one or more responses being responsive to the third set of information. For example, the application may be configured to transmit one or more additional responses to the one or more processors to authenticate the user. In this manner, the second number of knowledge-based authentication questions may be used to authenticate the user and responsive to the one or more additional requests from the one or more processors.

Figure 3:
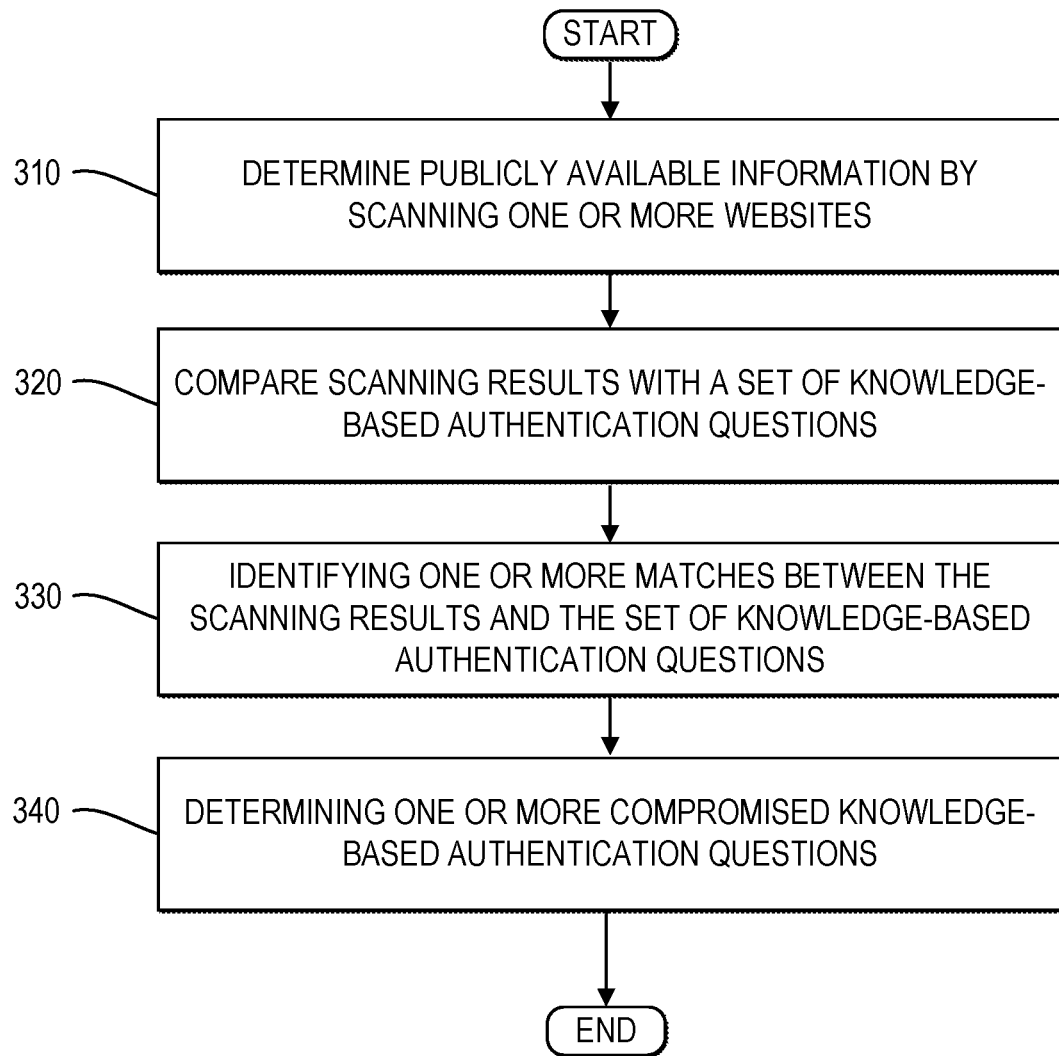
FIG. 3 depicts a method of determining compromised knowledge-based authentication questions according to an exemplary embodiment.

FIG. 3 depicts a method 300 of determining compromised knowledge-based authentication questions. FIG. 3 may reference the same or similar components of authentication system 100 of FIG. 1, and method 200 of FIG. 2.

At block 310, the method 300 may include determining publicly available information associated with a user by scanning one or more websites. For example, one or more processors of a server may be configured to scan one or more websites to determine publicly available information associated with a user using one or more template-based algorithms. For example, the one or more processors may be configured to verify the one or more results of the scanning based on the one or more template-based algorithms for each type of website associated with the first set of information. In some examples, one template-based algorithm for a website may be different from a template-based algorithm for another website. Depending on the type of website, there may be known data elements on a page, in which a search is made within that data element for compromised information. In some examples, a page may comprise a DOM element with a specific class or identifier, which may indicate that the element belongs to a publicly visible post associated with the user. Other data elements with other identifiers may indicate a post that was sent to the user. These data elements may comprise text, which includes the contents of the message itself. In another example, a DOM element may indicate other individuals or entities that the user is associated with. These may include, without limitation, friends and/or entities that the user follows or has subscribed to. It is understood that other data elements with respective identifiers may indicate, in addition to posts, a tweet, a retweet, tag, photo caption, photo tag, comment, mutual friend, friend, suggested contact, post, blog entry, or the like, and/or any combination thereof, may also be associated with the user.

In some examples, the one or more processors may be configured to scan the first set of information utilizing at least one selected from the group of an application programming interface and a web crawler. For example, the one or more processors may be configured to scan the first set of information utilizing an application programming interface. In this manner, one or more application programming interfaces may be called on, via one or more function calls by the one or more processors, to receive data. For example, a response of the application programming interface call may comprise a list including different messages that the user has posted, whether these messages were publicly available, and when they were posted. In another example, a response of the application programming interface call may comprise a list of all messages, including the different messages and the user that posted them. In this manner, the response may be selectively filtered to include messages relevant to the user in question.

In another example, the one or more processors may be configured to scan the first set of information utilizing a web crawler. For example, the web crawler may be configured to search, via the Internet, for any information associated with the user. In some examples, the information associated with the user may be any information that is publicly available via the Internet. The web crawler may look for one or more words and/or phrases, such as on a website, and then conduct a search within the entire text body associated with the website. For example, the web crawler may be configured to navigate to a search engine, input information, and initiate a search. Without limitation, the input information may include any user public information, such as their first name or first initial, their middle initial or middle name, their last name, and/or any combination thereof, and any and all of which may be partially redacted. The web crawler may be configured to parse a response associated with the initiated search and identify one or more links therein. The one or more processors may be configured to load each of the one or more links, and then search within the body of each of the respective websites loaded from each of the one or more links for any information related to the one or more knowledge-based authentication questions.

It is understood that the first set of information is not limited to social media information or social media accounts. The first set of information may include registration information. Moreover, other websites or accounts may be included as an addition or alternative to the social media information or social media accounts. For example, one or more websites may be scanned to determine publicly available information associated with a user. In one example, publicly available information associated with a user may be obtained from a school website associated with the user. In another example, publicly available information associated with a user may be obtained from an employer website associated with the user. In yet another example, publicly available information associated with a user may be obtained from a non-profit web site or volunteer organization website associated with the user. In yet another example, publicly available information associated with a user may be obtained from a government agency website listing a license associated with the user.

At block 320, the method 300 may include comparing results of the scanning with a set of knowledge-based authentication questions. For example, the one or more processors may be configured to compare one or more results of the scanning with a second set of information. In another example, the one or more processors may be configured to compare the results of the scanning from the web crawler process with the second set of information. The comparison of the one or more results from any of the scanning processes with the second set of information may yield compromised information associated with the user.

For example, the second set of information may comprise knowledge-based authentication information. In some examples, the one or more processors may be configured to generate the second set of information. In some examples, the knowledge-based authentication information may include one or more knowledge-based authentication questions. As referred to herein, a knowledge-based authentication question may be any question that is generated from any type of information requested or otherwise obtained in order to authenticate a user.

At block 330, the method 300 may include identifying one or more matches between the results of the scanning with the set of knowledge-based authentication questions. For example, the one or more processors may be configured to yield compromised information about a user, such as the name of their mascot, that was identified as a result of the scanning process. For example, the one or more processors may be configured to determine, via the first set of information, that a user attended a particular school or university or academic institution. Without limitation, this first set of information may be posted as a tweet, a retweet, tag, photo caption, photo tag, comment, mutual friend, friend, suggested contact, post, blog entry, or the like, such as the user attended the school during a particular time. Based on this first set of information, the one or more processors may be configured to identify the name of their school mascot as a result of the scanning process, thereby resulting in compromised information.

In another example, the one or more processors may be configured to yield compromised information about a user, such as their mother's maiden name, that was identified as a result of the scanning process. For example, the one or more processors may be configured to determine, via the first set of information, a user's mother's maiden name that was posted as a tweet, a retweet, tag, photo caption, photo tag, comment, mutual friend, friend, suggested contact, post, blog entry, or the like. Based on this first set of information, the one or more processors may be configured to identify the mother's maiden name as a result of the scanning process, thereby resulting in compromised information.

It is understood that simply providing information to a social media account does not necessarily amount to providing compromised information. For example, even though a birthdate may be provided to Facebook®, this may not equate to providing compromised information that may be matched with a corresponding knowledge-based authentication question because if Facebook does not show the birthdate, then this information would not be deemed publicly available. In some examples, publicly available information may comprise any information made available by the user to a social media account or website, and also an understanding or agreement that there was permission to post such information.

At block 340, the method 300 may include determining one or more compromised knowledge-based authentication questions based on the identification of the one or more matches. For example, the compromised knowledge-based authentication questions may include one or more matches by the one or more processors that are associated with, without limitation, at least one selected from the group of a name, birthday, mascot, school, pet, location, automobile, entertainment preferences, family, and/or any combination thereof that may be associated with the user and any number of knowledge-based authentication questions.

Figure 4:
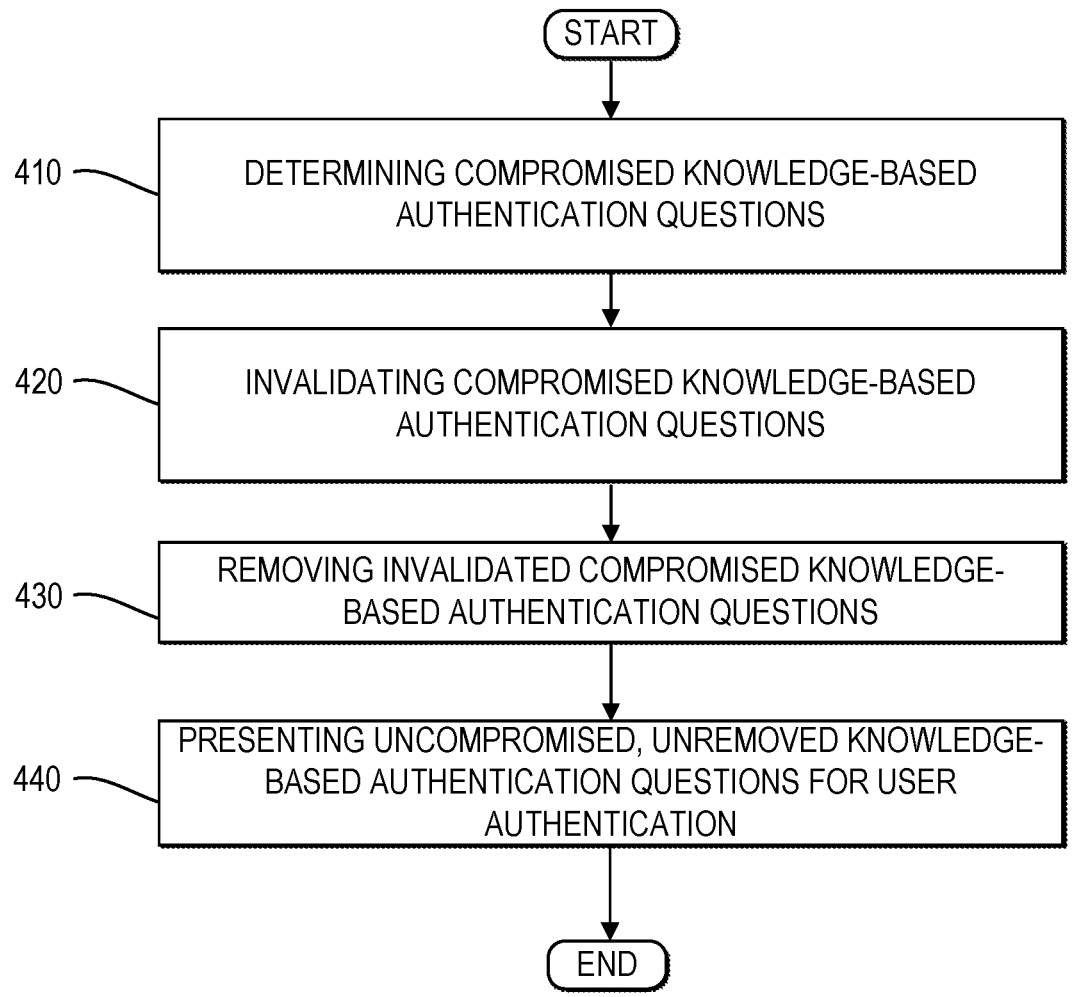
FIG. 4 depicts a method of invalidating compromised knowledge-based authentication questions according to an exemplary embodiment.

FIG. 4 depicts a method of a method of invalidating compromised knowledge-based authentication questions according to an exemplary embodiment. FIG. 4 may reference the same or similar components of system 100 of FIG. 1, method 200 of FIG. 2, and method 300 of FIG. 3.

At block 410, the method 400 may include determining compromised knowledge-based authentication questions. For example, one or more processors of a server may be configured to determine one or more compromised knowledge-based authentication questions, as explained above with reference to FIG. 3.

At block 420, the method 400 may include invalidating compromised knowledge-based authentication questions. For example, the one or more processors may be configured to invalidate one or more knowledge-based authentication questions from a second set of information based on the one or more matches with at least one selected from the group of a name, birthday, mascot, school, pet, location, automobile, entertainment preferences, family, and/or any combination.

At block 430, the method 400 may include removing the invalidated compromised knowledge-based authentication questions. For example, the second set of information associated with each of these types of compromised information may be removed from the set of knowledge-based authentication questions based on the respective matches by the one or more processors. Thus, the knowledge-based authentication questions associated with the compromised information are refrained from being presented for authentication since, to some degree, the compromised information was publicly available, and additional knowledge-based authentication questions may be presented in lieu of the eliminated knowledge-based authentication questions. In this manner, the compromised knowledge-based authentication questions are identified, invalidated, and refrained from presenting for authentication of the user. By way of example, even if only a single knowledge-based authentication question from a set of four knowledge-based authentication questions is eliminated based on a match to yield compromised information, this represents a 25% improvement since that particular compromised knowledge-based authentication question, no matter how obvious or minute, is invalidated and is significant since it is not used as part of the user authentication.

At block 440, the method 400 may include presenting uncompromised knowledge-based authentication questions. For example, the one or more processors may be configured to present a third set of information to an application to authenticate the user based on the removal of the one or more portions of the second set of information and by supplementing the first set of information with a fourth set of information. In some examples, the uncompromised knowledge-based authentication questions that excludes the compromised knowledge-based authentications.

In some examples, the third set of information may comprise a subset of the second set of information. For example, the second set of information may include a first number of knowledge-based authentication questions, such as 2 or more. The third set of information may comprise a second number of knowledge-based authentication questions. The second number may be smaller than the first number. For example, the second of information may include 5 knowledge-based authentication questions, and the third set of information may include 3 knowledge-based authentication questions.

In some examples, the fourth set of information may comprise comprises registration information associated with the user. Without limitation, registration information may include at least one selected from the group of name, mailing address, email, birthdate, user name, password, account number, credit card number, debit card number, and/or any combination thereof. For example, the one or more processors may be configured to authenticate the user by supplementing the social media information with registration information. In some examples, the registration information may be used to register an account with the user if a matching account has not been previously created. In other examples, the registration information may also be used to opt-in the user to use the application. In other examples, the registration information may also be used to register an account with the user if the user forgot their login and/or password.

The one or more processors may be configured to receive one or more additional responses from the application so as to authenticate the user, the one or more responses being responsive to the third set of information. For example, the application may be configured to transmit one or more additional responses to the one or more processors to authenticate the user. In this manner, the second number of knowledge-based authentication questions may be used to authenticate the user and responsive to the one or more additional requests from the one or more processors.

The one or more processors may be configured to present a fifth set of information to authenticate the user if the third set of information fails to reach a predetermined threshold number. The fifth set of information may comprise additional information that is supplemented to the second set of information. The additional information may include one or more additional knowledge-based authentication questions that are included in the second set of information, such as the original set of knowledge-based authentication questions. For example, the fifth set of information may be presented to authenticate the user if the third set of information fails to reach any threshold value, such as 4. With respect to the threshold value, if the one or more processors determine that there are not enough knowledge-based authentication questions that are asked, and/or that there are not enough responses received or otherwise responsive to the knowledge based authentication questions, the one or more processors may be configured to present additional knowledge-based authentication questions that are different from those presented in the third set of information. Thus, the knowledge-based authentication questions, or responses thereto, of the third set of information may fail to reach 4, in which case one or more additional knowledge-based authentication questions of a fifth set of information are presented so as to authenticate the user as part of a multifactor authentication process.

Figure 5:
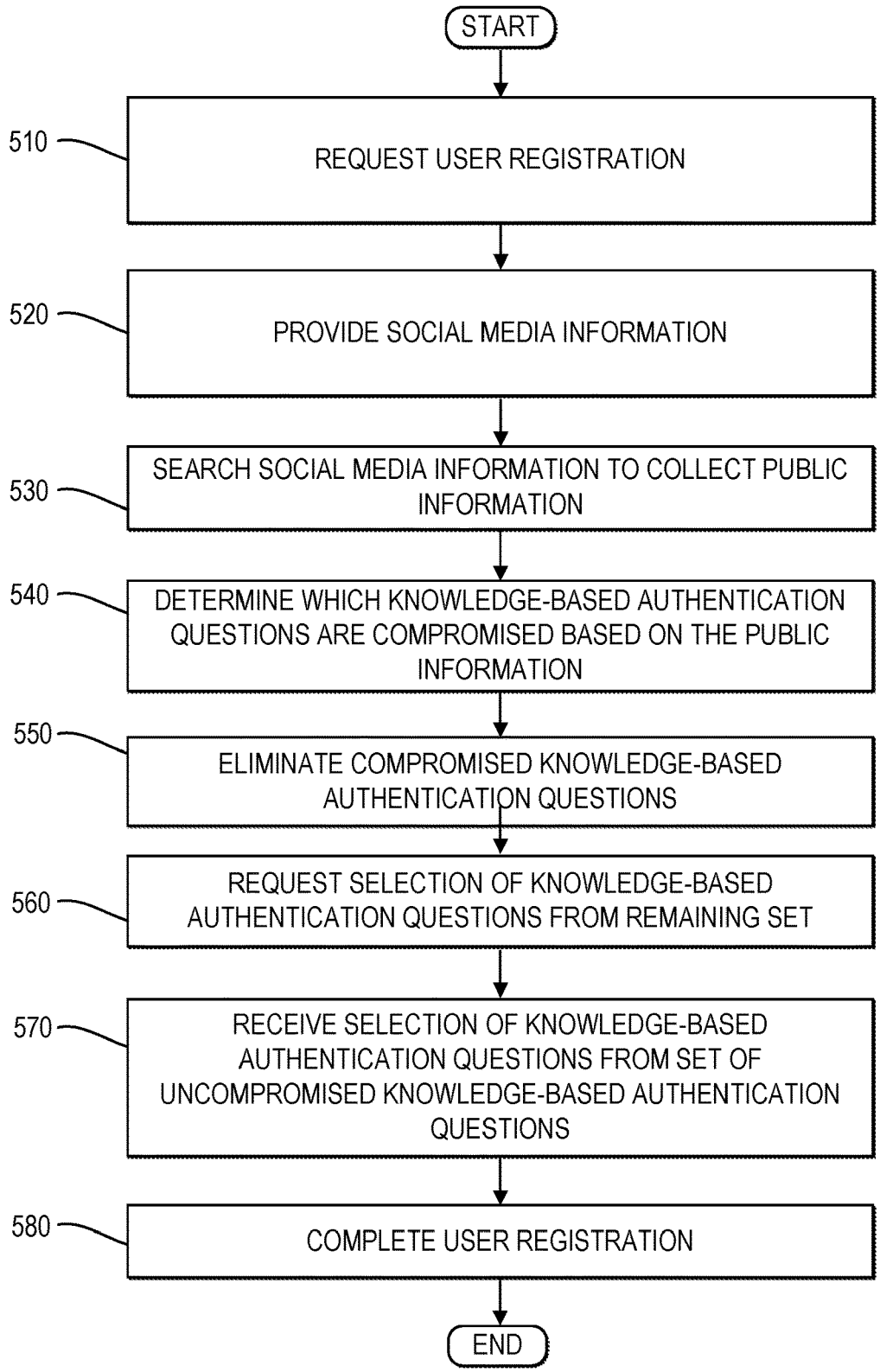
FIG. 5 depicts a method of creating user registration according to an exemplary embodiment.

FIG. 5 depicts a method 500 of creating user registration according to an exemplary embodiment. FIG. 5 may reference the same or similar components of authentication system 100 of FIG. 1, method 200 of FIG. 2, method 300 of FIG. 3, and method 400 of FIG. 4.

At block 510, the method 500 may include requesting user registration. In some examples, the user registration may be associated with an account. In some examples, the user registration may be for a secure website. For example, the user may be prompted, via an application comprising instructions for execution on a device, to register for the account or website.

At block 520, the method 500 may include providing social media information. For example, the social media information may be provided from a user via an application. The application may comprise instructions for execution on a client device. In another example, the social media information may be provided from a source other than the application, such as a server or database. As previously explained above, the information provided to one or more processors of a server is not limited to social media information.

In some examples, a first set of information may comprise social media information associated with a user. For example, the social media information may include at least one selected from the group of a social media handle, a social media username or login, a social media password. Without limitation, the social media handle may include any handle or identifier associated with a social media network, such as Facebook®, Twitter®, Instagram®, LinkedIn®, or the like. For example, this may include an "@" symbol that precedes the user name. Thus, the one or more processors, application, and/or database may connect to any of these social media networks to obtain the first set of information. Without limitation, the social media username or login may include any name or identifier associated with a social media account or profile. Without limitation, the social media password may be associated with the social media account, social media handle, and/or social media username or login. Without limitation, the social media profile may yield posts that have been made by the user or somebody else other than the user, and posts that the user engages with (including but not limited to likes, retweets, comments). In some examples, it may be desirable for a user to selectively opt-in, via the application, to provide social media information to the application, such that the user may selectively decide which contents of social media accounts may be shared and/or prohibited from being shared.

In some examples, the one or more processors may be configured to retrieve the first set of information from the application. For example, the application may be configured to display one or more prompts, responsive to the request from the one or more processors, that require input of the first set of information. In some examples, the application may transmit and receive input responsive to the request. For example, the application may be configured to display a prompt for a social media handle. The application may be configured to receive input, including but not limited to voice input, text input, image input, and/or any combination thereof, that includes the first set of information. In other examples, the one or more processors may be configured to retrieve the first set of information from a database via one or more requests. For example, the one or more processors may be configured to match a user based on registration information. Without limitation, registration information may include at least one selected from the group of name, mailing address, email, birthdate, user name, password, account number, credit card number, debit card number, and/or any combination thereof.

The one or more processors may be configured to receive, from the application, a response comprising the first set of information. For example, the application may be configured to transmit a response that is responsive to the request from the one or more processors. The application may be configured to present a display for input of the first set of information based on the request. In some examples, the application may transmit and receive input responsive to the request. For example, the application may be configured to display a prompt for a social media handle. The application may be configured to receive input, including but not limited to voice input, text input, image input, and/or any combination thereof, that includes the first set of information, such as the social media handle. In this manner, the application may be configured to transmit one or more responses includes the first set of information.

At block 530, the method 500 may include searching social media information to collect public information associated with a user. For example, the one or more processors may be configured to search the social media information to collect public information associated with a user. The one or more processors may be configured to search a social media profile to collect any information available about the user.

The information may be made available by the user directly or indirectly. In some examples, the information may be made available by the user directly. For example, the user may have posted a photo or comment in which they revealed information that may be used to determine potentially compromised information. In one example, the user may have commented on a social media post indicating that they are looking forward to attending their high school reunion. In another example, the user may have tagged a photo of their high school or with their high school friends. Even though the user did not explicitly indicate the name of their high school, or even included any information about their high school in their social media profile or otherwise indicated in their social media profile, this information may still be deemed public. In yet another example, the user may have replied to a wall post if they were planning to attend their high school reunion, using exemplary phrases as "yes" or "planning to be there" in response to a post or comment inquiring about their interest or availability regarding the high school reunion, "once a lion, always a lion", or "lions 2000" thereby suggesting or otherwise confirming that this was indeed the high school they attended by, without limitation, a mascot name identified with the high school and/or year of attendance. In some examples, these phrases may not explicitly include the high school name.

In another example, the information may be made available by somebody other than the user, such as indirectly. For example, the user may have been tagged in a post or photo they were a part of the high school. For example, another connection or friend may have identified the user as having attended the high school. In another example, a post or comment may be suggestive of the high school that the user attended, using exemplary phrases as "see you soon", "going to the reunion next month with my friends," or "looking forward to revisiting my freshman year buddies." It is not required that the name of the high school be explicitly identified in any of these examples in order to collect the public information about the user regarding the high school. It is understood that these examples are illustrative, and that other information may be collected from the social media profile.

The information may be searched using one or more template-based algorithms by scanning one or more websites to determine publicly available information associated with a user. For example, the one or more processors may be configured to verify the one or more results of the search based on the one or more template-based algorithms for each type of website associated with the first set of information. In some examples, one template-based algorithm for a website may be different from a template-based algorithm for another website. Depending on the type of website, there may be known data elements on a page, in which a search is made within that data element for compromised information. In some examples, a page may comprise a DOM element with a specific class or identifier, which may indicate that the element belongs to a publicly visible post associated with the user. Other data elements with other identifiers may indicate a post that was sent to the user. These data elements may comprise text, which includes the contents of the message itself. In another example, a DOM element may indicate other individuals or entities that the user is associated with. These may include, without limitation, friends and/or entities that the user follows or has subscribed to. It is understood that other data elements with respective identifiers may indicate, in addition to posts, a tweet, a retweet, tag, photo caption, photo tag, comment, mutual friend, friend, suggested contact, post, blog entry, or the like, and/or any combination thereof, may also be associated with the user In some examples, the one or more processors may be configured to search the first set of information utilizing at least one selected from the group of an application programming interface and a web crawler. For example, the one or more processors may be configured to search the first set of information utilizing an application programming interface. In this manner, one or more application programming interfaces may be called on, via one or more function calls by the one or more processors, to receive data. For example, a response of the application programming interface call may comprise a list including different messages that the user has posted, whether these messages were publicly available, and when they were posted. In another example, a response of the application programming interface call may comprise a list of all messages, including the different messages and the user that posted them. In this manner, the response may be selectively filtered to include messages relevant to the user in question.

In another example, the one or more processors may be configured to search the first set of information utilizing a web crawler. For example, the web crawler may be configured to search, via the Internet, for any information associated with the user. In some examples, the information associated with the user may be any information that is publicly available via the Internet. The web crawler may look for one or more words and/or phrases, such as on a website, and then conduct a search within the entire text body associated with the website. For example, the web crawler may be configured to navigate to a search engine, input information, and initiate a search. Without limitation, the input information may include any user public information, such as their first name or first initial, their middle initial or middle name, their last name, and/or any combination thereof, and any and all of which may be partially redacted. The web crawler may be configured to parse a response associated with the initiated search and identify one or more links therein. The one or more processors may be configured to load each of the one or more links, and then search within the body of each of the respective websites loaded from each of the one or more links for any information related to the one or more knowledge-based authentication questions.

It is understood that the first set of information is not limited to social media information or social media accounts. The first set of information may include registration information. Moreover, other websites or accounts may be included as an addition or alternative to the social media information or social media accounts. For example, one or more websites may scanned to determine publicly available information associated with a user. In one example, publicly available information associated with a user may be obtained from a school website associated with the user. In another example, publicly available information associated with a user may be obtained from an employer website associated with the user. In yet another example, publicly available information associated with a user may be obtained from a non-profit web site or volunteer organization website associated with the user. In yet another example, publicly available information associated with a user may be obtained from a government agency website listing a license associated with the user.

At block 540, the method 500 may include determining which knowledge-based authentication questions are compromised based on the public information. For example, the one or more processors may be configured to determine compromised knowledge-based authentication questions based on one or more matches between the publicly available information collected and knowledge-based authentication questions corresponding to, suggestive of, or otherwise related to knowledge-based authentication questions including the publicly information collected. For example, one or more processors of the server may be configured to determine one or more compromised knowledge-based authentication questions, as explained above with reference to FIG. 3.

Returning back to the previous example, the high school mascot may be identified that may be associated with the high school name made available through the direct or indirect manner explained above. Thus, if any question from the knowledge-based authentication questions matches the question that includes, without limitation, what the name of the high school was and/or what the name of the mascot was and/or what year was the high school attendance and/or the location of the high school, this question may be determined to be compromised.

At block 550, the method 500 may include eliminating compromised knowledge-based authentication questions. For example, after determining which knowledge-based authentication questions are compromised based on the public information, this particular question may be eliminated. For example, the knowledge-based authentication question that requested a response to the name of the high school, the name of the mascot, the time of high school attendance, the location of the high school, or any other information suggestive of the high school, and/or any combination thereof, may be eliminated from being presented to the user for authentication. By way of example, a set of knowledge-based authentication questions may include questions about favorite color, high school mascot, high school, and mother's maiden name. In this case, the high school mascot knowledge-based authentication question and the high school knowledge-based authentication question may be eliminated since they were deemed to have been compromised.

At block 560, the method 500 may include requesting selection of knowledge-based authentication questions from the remaining set of uncompromised knowledge-based authentication questions. For example, after the compromised knowledge-based authentication questions have been eliminated, the user may be permitted to selectively identify which of the remaining uncompromised knowledge-based authentication questions to respond do. In another example, the one or more processors may be configured to selectively identify which of the remaining uncompromised knowledge-based authentications to answer. In response to the request for selective identification, the application may be configured to transmit one or more responses that are responsive to the request for selectively identifying which of the remaining uncompromised knowledge-based authentication questions to answer. By way of example, the application may be configured to selectively identify the favorite color and/or the mother's maiden name knowledge-based authentication questions, since the compromised high school mascot and high school knowledge-based authentication questions would have been deemed compromised and eliminated.

At block 570, the method 500 may include receiving selection of knowledge-based authentication questions. For example, the application may be configured to receive customized selection of knowledge-based authentication questions are not compromised. In some examples, the application may be configured to receive one or more responses that are responsive to the requested selection of any number of knowledge-based authentication questions from the remaining set of uncompromised knowledge-based authentication questions. The one or more responses may include an answer, via the application, to each of the knowledge-based authentication questions that remain uncompromised. By way of example, the application may be configured to respond to each of the selectively identified knowledge-based authentication questions, and in this case, identify the favorite color and/or the mother's maiden name knowledge-based authentication questions.

At block 580, the method 500 may include completing user registration. For example, the one or more processors may be configured to complete user registration for the account or website after it has authenticated the user by validating each of the one or more responses received from the application.

Figure 6:
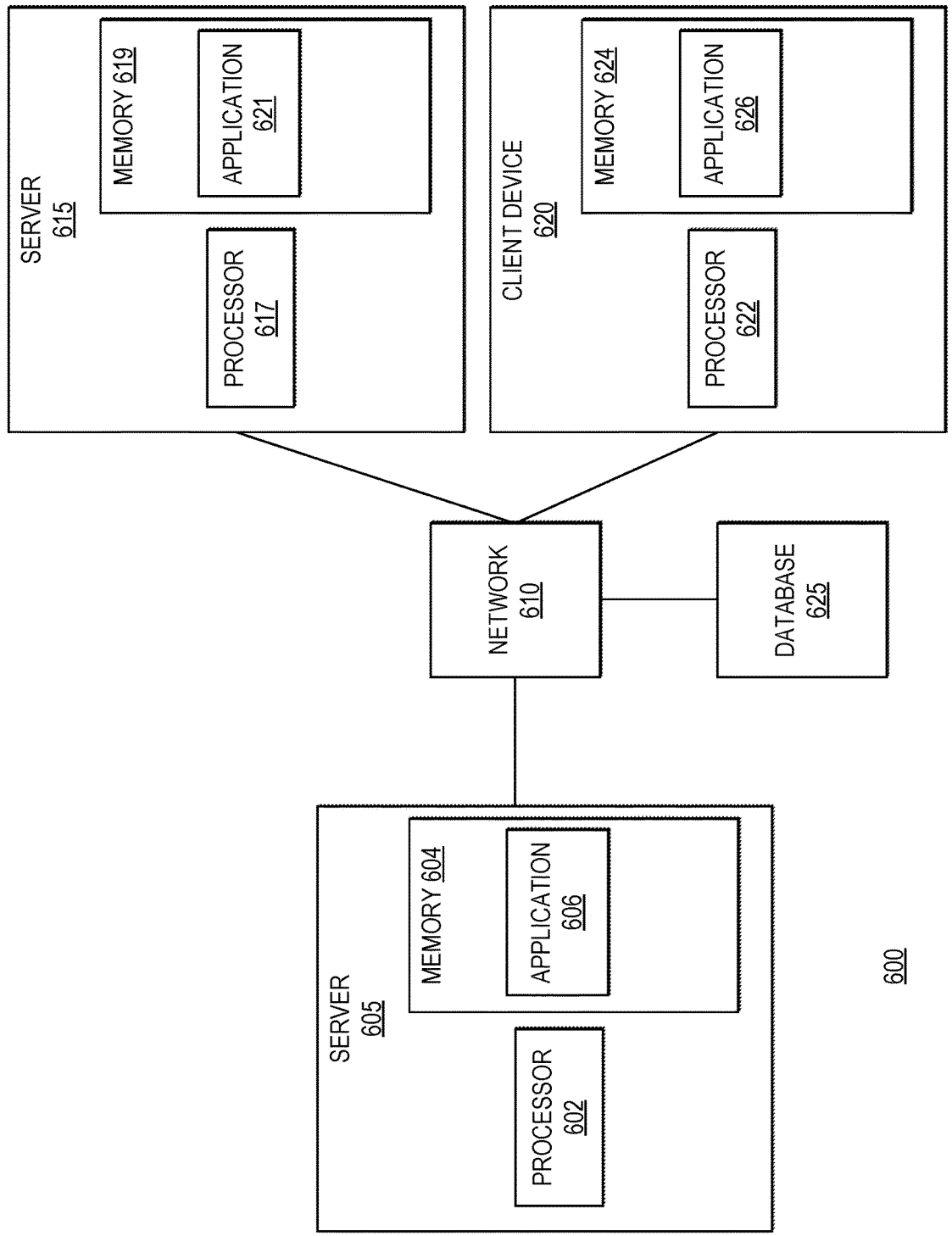
FIG. 6 depicts an authentication system according to an exemplary embodiment.

FIG. 6 illustrates an authentication system 600 according to an exemplary embodiment. The authentication system 600 may comprise a crawling server 605, a network 610, a server 615, a client device 620, and a database 625. Although FIG. 6 illustrates single instances of components of system 600, system 600 may include any number of components. FIG. 6 may reference same or similar components of authentication system 100 of FIG. 1, method 200 of FIG. 2, method 300 of FIG. 3, method 400 of FIG. 4, and method 500 of FIG. 5.

Server 605 may comprise a crawling server. Server 605 may include processor 602 and memory 604. Memory 604 may include application 606 comprising instructions for execution on server 605. The application 606 may be in communication with any components of system 600. For example, server 605 may execute one or more applications that enable, for example, network and/or data communications with one or more components of system 600 and transmit and/or receive data. Without limitation, server 605 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 605 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 605 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 605 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 600 may include a network 610. In some examples, network 610 may be one or more of a wireless network, a wired network or any combination of wireless network and wired network, and may be configured to connect to any one of components of system 600. For example, client device 620 may be configured to connect to server 605 via network 610. In some examples, network 610 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 610 may include, without limitation, telephone lines, fiber optics, IEEE Ethernet 902.3, a wide area network, a wireless personal area network, a LAN, or a global network such as the Internet. In addition, network 610 may support an Internet network, a wireless communication network, a cellular network, or the like, or any combination thereof. Network 610 may further include one network, or any number of the exemplary types of networks mentioned above, operating as a stand-alone network or in cooperation with each other. Network 610 may utilize one or more protocols of one or more network elements to which they are communicatively coupled. Network 610 may translate to or from other protocols to one or more protocols of network devices. Although network 610 is depicted as a single network, it should be appreciated that according to one or more examples, network 610 may comprise a plurality of interconnected networks, such as, for example, the Internet, a service provider's network, a cable television network, corporate networks, such as credit card association networks, and home networks.

System 600 may include one or more servers 615. In some examples, server 615 may include one or more processors 617 coupled to memory 619. Server 615 may be configured as a central system, server or platform to control and call various data at different times to execute a plurality of workflow actions. Server 615 may be configured to connect and may in data communication with server 605, client device 615, and/or database 625. Server 605 may be in communication with one or more servers 615 via one or more networks 610, and may operate as a respective front-end to back-end pair with server 615. Server 605 may transmit, for example from application 606 executing thereon, one or more requests to server 615. The one or more requests may be associated with retrieving data from server 615. Server 615 may receive the one or more requests from server 605. Based on the one or more requests from application 606, server 615 may be configured to retrieve the requested data. Server 615 may be configured to transmit the received data to application 606, the received data being responsive to one or more requests.

Server 615 may include an application 621 comprising instructions for execution thereon. For example, the application 621 may comprise instructions for execution on the server 615. The application may be in communication with any components of system 600. For example, server 615 may execute one or more applications that enable, for example, network and/or data communications with one or more components of system 600 and transmit and/or receive data. Without limitation, server 615 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 615 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 615 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 615 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 600 may include a client device 620. The client device 620 may include one or more processors 622, and memory 624. Memory 624 may include one or more applications 626. Client device 620 may be in data communication with any number of components of system 600. For example, client device 620 may transmit data via network 610 to server 605. Client device 620 may transmit data via network 610 to database 625. Without limitation, client device 620 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Client device 620 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 620 may include processing circuitry and may contain additional components, including processors, memories, error and parity/CRC checkers, data encoders, anticollision algorithms, controllers, command decoders, security primitives and tamperproofing hardware, as necessary to perform the functions described herein. The client device 620 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 600 may include one or more databases 625. The database 625 may comprise a relational database, a non-relational database, or other database implementations, and any combination thereof, including a plurality of relational databases and non-relational databases. In some examples, the database 625 may comprise a desktop database, a mobile database, or an in-memory database. Further, the database 625 may be hosted internally by the client device 620 or servers 605, 615, or the database 625 may be hosted externally to the client device 620 and servers 605, 615, by a cloud-based platform, or in any storage device that is in data communication with the client device 625 and servers 605, 615. In some examples, database 625 may be in data communication with any number of components of system 600. For example, servers 605, 615 or client device 620 may be configured to retrieve the requested data from the database 625 that is transmitted by application 606, 621, or 626. Server 605 may be configured to transmit the received data from database 625 to application 606 via network 610, the received data being responsive to the transmitted one or more requests. In other examples, applications 606, 621, 626 may be configured to transmit one or more requests for the requested data from database 625 via network 610.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the server 605, server 615, client device 620, and/or database 625, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Crawling server 605 may be configured to perform one or more processes to authenticate the user. For example, the one or more processors 602 may be configured to parse a first set of information using one or more template-based algorithms by scanning one or more websites to determine publicly available information associated with a user. For example, the one or more processors 602 may be configured to verify the one or more results of the parsing based on the one or more template-based algorithms for each type of website associated with the first set of information. In some examples, one template-based algorithm for a website may be different from a template-based algorithm for another website. Depending on the type of website, there may be known data elements on a page, in which a search is made within that data element for compromised information. In some examples, a page may comprise a DOM element with a specific class or identifier, which may indicate that the element belongs to a publicly visible post associated with the user. Other data elements with other identifiers may indicate a post that was sent to the user. These data elements may comprise text, which includes the contents of the message itself. In another example, a DOM element may indicate other individuals or entities that the user is associated with. These may include, without limitation, friends and/or entities that the user follows or has subscribed to. It is understood that other data elements with respective identifiers may indicate, in addition to posts, a tweet, a retweet, tag, photo caption, photo tag, comment, mutual friend, friend, suggested contact, post, blog entry, or the like, and/or any combination thereof, may also be associated with the user In some examples, the one or more processors 602 may be configured to parse the first set of information utilizing at least one selected from the group of an application programming interface and a web crawler. For example, the one or more processors 602 may be configured to parse the first set of information utilizing an application programming interface. In this manner, one or more application programming interfaces may be called on, via one or more function calls by the one or more processors 602, to receive data. For example, a response of the application programming interface call may comprise a list including different messages that the user has posted, whether these messages were publicly available, and when they were posted. In another example, a response of the application programming interface call may comprise a list of all messages, including the different messages and the user that posted them. In this manner, the response may be selectively filtered to include messages relevant to the user in question.

In another example, the one or more processors 602 may be configured to parse the first set of information utilizing a web crawler. For example, the web crawler may be configured to search, via the Internet, for any information associated with the user. In some examples, the information associated with the user may be any information that is publicly available via the Internet. The web crawler may look for one or more words and/or phrases, such as on a website, and then conduct a search within the entire text body associated with the website. For example, the web crawler may be configured to navigate to a search engine, input information, and initiate a search. Without limitation, the input information may include any user public information, such as their first name or first initial, their middle initial or middle name, their last name, and/or any combination thereof, and any and all of which may be partially redacted. The web crawler may be configured to parse a response associated with the initiated search and identify one or more links therein. The one or more processors 602 may be configured to load each of the one or more links, and then search within the body of each of the respective web sites loaded from each of the one or more links for any information related to the one or more knowledge-based authentication questions.

Any type of information may be hosted by server 615, client device 620, and/or database 625 in order to authenticate the user by server 605. For example, in an exemplary authentication process, crawling server 605 may be configured to transmit one or more requests to client device 620 to obtain and/or validate a social media account information of a user, transmit one or more requests to server 615 to obtain and/or validate publicly available information of a user, and transmit one or more requests to database 625 to obtain and/or validate user authentication information.

After receiving information responsive to any of the one or more requests, crawling server 605 may also be configured to compare the information with any number of knowledge-based authentication questions. Continuing with the above example, crawling server 605 may be configured to receive social media account information of a user from client device 620, publicly available information from server 615, and user authentication information from database 625.

For example, the crawling server 605 may be configured to identify any matches between each of these types of information with one or more knowledge-based authentication questions. Once crawling server 605 has identified one or more matches, crawling server 605 may be configured to classify the matched knowledge-based authentication question as a compromised knowledge-based authentication question. In this manner, crawling server 605 may be configured to invalidate and/or eliminate any number of compromised knowledge-based authentication questions when it presents uncompromised knowledge-based authentication questions.

In other examples, any of the other components may perform any number of the operations performed by crawling server 605. It is understood that any of these operations may be performed by different types of devices as illustrated in FIG. 6. It is further understood that any of these operations may be performed fully or partially by any number of any of the components, including but not limited to by processors 602, 617, 622 via applications 606, 621, 626 as illustrated in FIG. 6. For example, server 615, client device 625, and/or database 630 may be configured to individually or collectively or partially perform any of transmitting the one or more requests, receiving the one or more requests, parsing of the first type of information, comparing the results of the parsing with any number of knowledge-based authentication questions, identifying any number of compromised knowledge-based authentication questions, invalidating and eliminating the compromised knowledge-based authentication questions, presenting uncompromised knowledge-based authentication questions excluding the identified compromised knowledge-based authentication questions, determining if the presented set of knowledge-based authentication questions reaches a predetermined threshold number, presenting additional knowledge-based authentication questions if the presented set of knowledge-based authentication questions fails to reach the predetermined threshold number, receiving one or more responses to the presented set of knowledge-based authentication questions to authenticate the user, and/or any combination thereof.

It is understood that the first set of information is not limited to social media information or social media accounts. The first set of information may include registration information. Moreover, other websites or accounts may be included as an addition or alternative to the social media information or social media accounts. For example, one or more websites may scanned to determine publicly available information associated with a user. In one example, publicly available information associated with a user may be obtained from a school website associated with the user. In another example, publicly available information associated with a user may be obtained from an employer website associated with the user. In yet another example, publicly available information associated with a user may be obtained from a non-profit web site or volunteer organization website associated with the user. In yet another example, publicly available information associated with a user may be obtained from a government agency website listing a license associated with the user. As previously explained, crawling server 605, server 615, client device 625, and/or database 630 may be configured to any of these operations.

Without limitation, the authentication information may include at least one selected from the group of login credentials, account information, security information, biometric information and/or any combination thereof (e.g., entry of a user name, a password, an account number, a security code, a one-time passcode, an answer to a security question, a fingerprint, a facial scan, a retinal scan, a voice recognition.)

Benefits of the disclosed systems and methods include improved security and data protection, mitigated or reduced likelihood of compromised information and use of compromised information, and more efficient process for the user experience that results in a more secure, reliable, and dynamic manner without comprising data or user integrity. In this manner, the compromised knowledge-based authentication questions are identified, invalidated, and refrained from presenting for authentication of the user. By way of example, even if only a single knowledge-based authentication question from a set of four knowledge-based authentication questions is eliminated based on a match to yield compromised information, this represents a 25% improvement in authentication since that particular identified compromised knowledge-based authentication question, no matter how obvious or minute, is invalidated and this is significant because it is eliminated from part of the user authentication.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An authentication system comprising:
a server, the server including one or more processors configured to:
validate authentication information received from an application comprising instructions for execution on a device;
transmit, to the application, a request for a first set of information after validation of the authentication information;
receive, from the application, a response comprising the first set of information;
parse the first set of information using one or more template-based algorithms by scanning one or more websites to determine publicly available information associated with a user;
verify the one or more results of the parsing based on the one or more template-based algorithms for each type of website associated with the first set of information;
compare one or more results of the parsing with a second set of information, the comparison of the one or more results with the second set of information yielding compromised information associated with the user;
eliminate one or more portions of the second set of information based on the comparison,
present a third set of information to the application to authenticate the user based on the elimination of the one or more portions of the second set of information and by supplementing the first set of information with a fourth set of information; and
present a fifth set of information to authenticate the user if the third set of information fails to reach a predetermined threshold number.

2. The authentication system of claim 1, wherein the first set of information comprises social media information associated with the user.

3. The authentication system of claim 1, wherein the one or more processors are configured to parse the first set of information utilizing at least one selected from the group of an application programming interface and a web crawler.

4. The authentication system of claim 1, wherein the second set of information comprises knowledge-based authentication information.

5. The authentication system of claim 1, wherein the third set of information comprises a subset of the second set of information.

6. The authentication system of claim 1, wherein the fourth set of information comprises registration information associated with the user.

7. The authentication system of claim 1, wherein the fifth set of information comprises additional information supplemented to the second set of information.

8. The authentication system of claim 1, wherein the compromised information includes one or more matches associated with at least one selected from the group of a name, birthday, mascot, school, pet, location, automobile, entertainment preferences, and family.

9. The authentication system of claim 1, wherein the one or more processors are further configured to receive one or more additional responses from the application so as to authenticate the user, the one or more responses being responsive to the third set of information.

10. A method of authenticating a user, the method comprising:
validating authentication information;
requesting a social media handle after validating the authentication information;
parsing a social media account associated with the social media handle using one or more template-based algorithms by scanning one or more websites to determine publicly available information associated with a user;
verifying the results of the parsing based on the one or more template-based algorithms for each type of website associated with the social media account;
comparing results of the parsing with a plurality of a first set of knowledge-based authentication questions, the comparison of the one or more results with the plurality of the first set of knowledge-based authentication questions yielding compromised information associated with the user;
eliminating one or more questions of the knowledge-based authentication questions based on the comparison;
presenting a second set of knowledge-based authentication questions, the second set of knowledge-based questions including a modified version of the first set of knowledge-based authentication questions based on the eliminated one or more questions;
determining if the second set of knowledge-based authentication questions reaches a predetermined threshold number, and presenting additional knowledge-based authentication questions if the second set of knowledge-based authentication questions fails to reach the predetermined threshold number; and
receiving one or more responses to the second set of knowledge-based authentication questions to authenticate the user.

11. The method of claim 10, further comprising comparing registration information associated with the user with the plurality of the first set of knowledge-based authentication questions.

12. The method of claim 10, wherein parsing the social media account utilizes at least one selected from the group of an application programming interface and a web crawler.

13. The method of claim 10, wherein the scanning reveals at least one selected from the group of a familial connection, user activity with the social media account, name, birthday, mascot, school, pet, location, family, automobile, entertainment preferences, and any combination thereof.

14. The method of claim 13, wherein the user activity includes user engagement with the social media account including at least one selected from the group of posted messages, likes, comments, tweets, retweets, tags, and any combination thereof.

15. The method of claim 10, further comprising transmitting the social media handle via one or more prompts.

16. The method of claim 10, further comprising collecting user information prior to presenting the second set of knowledge-based authentication questions.

17. The method of claim 10, further comprising registering the user for an account after authenticating the user.

18. A computer readable non-transitory storage medium comprising computer-executable instructions that are executed on a processor and comprise the steps of:
validating authentication information;
obtaining a first set of information after validating the authentication information;

parsing the first set of information using one or more template-based algorithms by scanning one or more websites to determine publicly available information associated with a user;

verifying the results of the parsing based on the one or more template-based algorithms for each type of website associated with the social media account;

comparing one or more results of the parsing with a second set of information, the comparison of the one or more results with the second set of information yielding compromised information associated with the user;

eliminating one or more portions of the second set of information based on the comparison;

presenting a third set of information to the application based on the elimination of the one or more portions of the second set of information and by supplementing the first set of information with a fourth set of information;

presenting a fifth set of information to authenticate the user if the third set of information fails to reach a predetermined threshold number; and receiving one or more responses to the third set of information so as to authenticate a user.

19. The computer readable non-transitory storage medium of claim 18, wherein:

each type of website is associate with one or more known data elements, and scanning the websites comprises searching within each of the one or more known data elements.

20. The computer readable non-transitory storage medium of claim 19, wherein the one or more known data elements comprises an identifier indicating whether the one or more known data elements are publicly visible.

\* \* \* \* \*